United States Patent [19]

Roston

[11] Patent Number: 4,760,497
[45] Date of Patent: Jul. 26, 1988

[54] BRACKET MOUNT FOR AUTOMOBILE RADAR DETECTOR UNIT

[76] Inventor: Stewart A. Roston, 8 Newport Ct., Long Branch, N.J. 07740

[21] Appl. No.: 50,691

[22] Filed: May 18, 1987

[51] Int. Cl.[4] .............................................. H05K 7/10
[52] U.S. Cl. ................................ 361/427; 248/206.3; 342/20; 439/534; 455/351; 361/417
[58] Field of Search ............... 381/86, 87, 88; 342/20; 439/342, 534; 248/205.2, 206.2, 206.3; 361/331, 340, 346, 380, 392, 426, 427, 428, 429, 417, 419, 420; 455/269, 328, 351

[56] References Cited

U.S. PATENT DOCUMENTS

| | | | |
|---|---|---|---|
| 4,019,170 | 4/1977 | Gould | 361/331 |
| 4,171,855 | 10/1979 | Raskin | 439/534 |
| 4,419,770 | 12/1983 | Yagi | 455/351 |
| 4,613,989 | 9/1986 | Fende | 342/20 |
| 4,635,110 | 1/1987 | Weinblatt | 381/86 |
| 4,648,572 | 3/1987 | Sokol | 248/206.2 |

Primary Examiner—G. P. Tolin
Attorney, Agent, or Firm—Clifford G. Frayne

[57] ABSTRACT

A mounting bracket for a radar detecting unit comprised of a fixed or angularly adjustable V-shaped mount defined by two leg units, the first leg being secured to the radar detecting unit and the second leg having secured thereto at least one male electrical connector, this male connector and second leg being adapted to be inserted into a female receptacle mounted on the windshield of the vehicle, the female receptacle being in electrical communication with the power source for operation of the radar detecting unit, the V-shaped mount permitting the slidable engagement of the radar detecting unit and mount into frictional engagement and electrical contact with the female receptacle mounted on the windshield.

11 Claims, 2 Drawing Sheets

BRACKET MOUNT FOR AUTOMOBILE RADAR DETECTOR UNIT

FIELD OF INVENTION

The invention relates to a self-contained electronic mounting bracket for personal radar detectors for use in vehicles such as automobiles or motorcycles and, more particularly, to a windshield or fairing mount which permits the unit to operate at optimum efficiency and permits the driver to connect and disconnect the unit in an expeditious manner.

BACKGROUND OF THE INVENTION

Radar detector units have become a popular accessory for vehicles in recent years and units of various convenient sizes are available in the marketplace. If the unit is not installed by a manufacturer, the owner of the vehicle must mount the unit in a convenient location that permits the operator to activate the unit while driving. In operation, as advised by the manufacturers of such radar detecting units, the unit functions at its optimum when placed proximate to the windshield thus giving it an unobstructed monitoring zone forward of the vehicle and providing the driver with either an audio or visual signal or both.

The popularity of radar units has also seen a rise in the theft of radar units which are mounted in such a way that they are visible from outside the vehicle. Further, in some states, the use of such radar detecting units is illegal and thus, the operator of the vehicle in many instances would desire to disconnect and remove the radar detecting unit from the dashboard or windshield and place it in a concealed location. This easy removal, either for anti-theft purposes or for purposes of removing the unit in a jurisdiction where they are illegal at present, is not easily accomplished by the operator.

Units which permit mounting proximate to the windshield require special brackets and adhesives or suction cups to maintain the unit in position, normally on the dashboard, and require the operator to electrically connect the unit in a separate operation. See U.S. Pat. No. 4,648,572. Thus, two hands are required for removal of the unit from such a mount, which removal cannot be accomplished when the vehicle is being operated without extreme danger to the occupants.

The Applicant's mount incorporates the electronics for the radar detecting unit with the mount so that the unit may be connected and become operational with one hand and removed and concealed with the use of one hand.

OBJECTS OF THE INVENTION

The object of the present invention is to provide a novel mounting bracket for the mounting of a radar detector unit on or proximate to the windshield of a vehicle.

Another object of the present invention is to provide a novel mounting bracket for a radar detecting unit which incorporates the electrical connections for the radar detecting unit thus permitting ease of activation and deactivation.

A still further object of the present invention is to provide a novel mounting bracket for a radar detecting unit that permits the mounting of the unit in its optimum position in the vehicle and permits the ease of connection and disconnection.

A still further object of the present invention is to provide a novel mounting bracket for a radar detecting unit, which bracket is molded and incorporated into the radar detector shell as one unit.

A still further object of the present invention is to provide a novel mounting bracket for a radar detecting unit to facilitate the mounting of the unit on a motorcycle.

SUMMARY OF THE INVENTION

These and other objects of the present invention are achieved by a mounting bracket for a radar detecting unit which comprises a fixed or angularly adjustable V-shaped mount comprised of two legs, the first leg being secured to the radar detecting unit, the second leg having secured thereto at least one male connector, the radar detecting unit being in electrical communication to the male connector, the male connector being adapted to be inserted into a female receptacle mounted on the windshield of the vehicle, the female receptacle being in electrical communication with the power source for operation of the radar detecting unit, the V-shaped mount permitting the slidable engagement of the radar detecting unit and support thereof by means of the frictional engagement of the male electrical connector mounted on the bracket with the female electrical receptacle mounted on the windshield.

BRIEF DESCRIPTION OF THE DRAWINGS

A better understanding of the present invention as well as other objects and advantages thereof, will become apparent upon consideration of the detailed disclosure thereof, especially when taken with the accompanying drawings wherein.

DETAILED DESCRIPTION OF THE DRAWINGS

Figure 1:
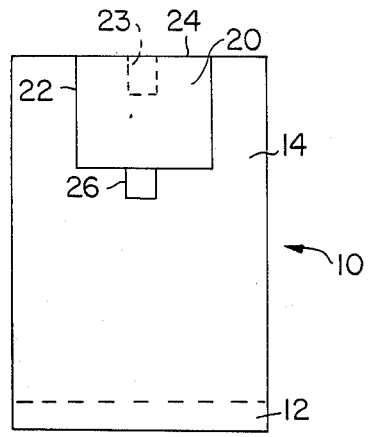
FIG. 1 is a front elevational view of a first embodiment of the bracket mount and connector.
Figure 2:
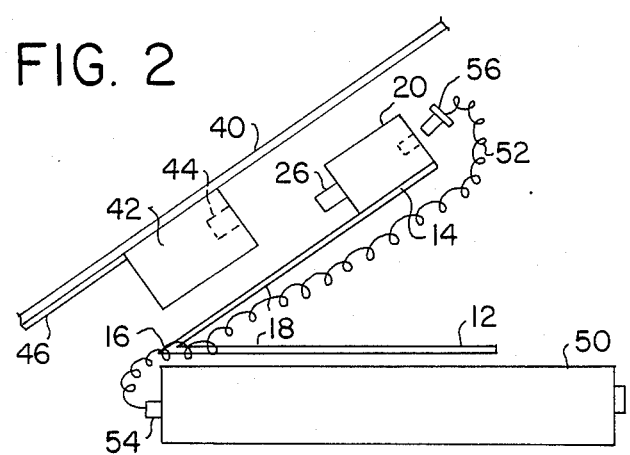
FIG. 2 is an exploded side elevational view of the radar detector and first embodiment of the mounting bracket and connectors.

Referring to FIG. 1, there is shown a front elevational view of the first embodiment of bracket mount 10 having secured thereto, connector 20. Bracket mount 10 is V-shaped as can be seen by FIG. 2 and comprises a first planar leg 12 and a second planar leg 14, planar legs 12 and 14 having a common vertice 16. The angle 18 between planar legs 12 and 14 is adjustable from mount to mount to permit planar leg 12 to be in a substantially horizontal position while planar leg 14 adapts so as to be substantially parallel to the windshield to which the mount is to be connected.

Connector 20 is secured to planar leg 14 proximate to its end. Connector 20 is comprised of a nonconducting outer shell 22 having a female receptacle 23 depending inwardly from upper end 24 to accommodate an electrical connection from the radar detector as described hereafter, and an electrically conductive male terminus 26 depending downwardly from nonconductive shell 22 for cooperation with a female receptacle as described hereafter. Female receptacle 23 in end 24 of connector 20 and the male terminus 26 are electrically connected within nonconductive shell 22.

Referring to FIG. 2, there is an exploded view of the radar detector mount, radar detecting unit, and the windshield of the vehicle. Windshield 40 has secured thereto, a connector 42 having disposed therein, a female receptacle 44 at its upper end. Connector 42 is secured to a power source by means of electrical connection 46 which can either run downwardly along the windshield or upwardly to the roof of the vehicle and then to the side panel and downwardly to the power source. The angle 18 between planar leg 12 and planar leg 14 of mounting bracket 10 is designed to be substantially equal to the angle of the windshield of the vehicle in question so as to permit planar leg 12 to be in a substantially horizontal position. There would be secured to planar leg 12 of bracket mount 10, the radar unit 50. Radar unit 50 could be secured by adhesive or tape with the intent being that bracket mount 10 and radar unit 50 would function as one unit. The electrical connection 52 which comprises a spaghetti cord having two male connectors 54 and 56 at opposing ends, would be secured to radar unit 50 and to the female receptacle 23 contained in the end of connector 20.

In this configuration, the radar unit 50 in combination with mounting bracket 10 and connector 20 is ready for operation as soon as it is subjected to a power source.

Figure 3:
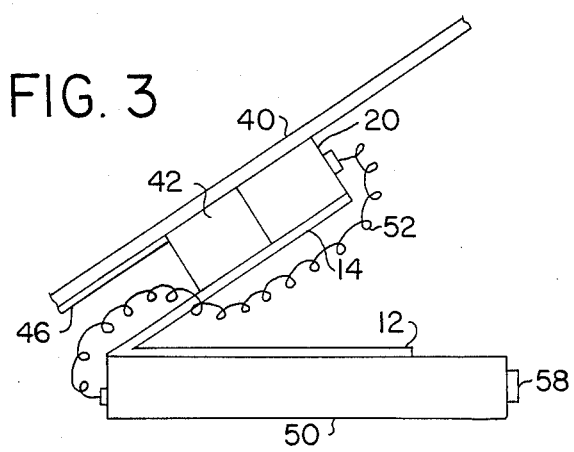
FIG. 3 is a side elevational view of the radar detector and first embodiment secured to the mount.

Referring to FIG. 3, it can be seen that the radar unit 50 secured to mounting bracket 10, is secured in position by sliding male terminus 26 on connector 20 into female receptacle 44 in connector 42 which is secured to windshield 40. This frictional or snap-lock engagement secures the radar unit 50 in a substantially horizontal position on the windshield providing it with an uninterrupted monitoring zone forward of the vehicle and convenient for operation by the operator. If connector 42 mounted on windshield 40 is already electrically conductive, as soon as the connection is made between male terminus 26 and female receptacle 44, the unit is ready for operation by merely operating the on-off button 58.

For ease of removal, the operator merely turns off the radar detector or lifts upwardly and rearwardly by grasping the radar detector and mounting bracket 50 and 10, respectively, so as to disengage male terminus 26 from female receptacle 44. The unit is then conveniently stored under the seat or in the glove compartment until further use is required.

The mounting bracket 10 itself can be made of any sturdy, rigid material such as metal or plastic which would be capable of supporting the weight of the radar unit and which would be easily adaptable for angular change between the planar legs to permit adaptation to varying windshield angles. Further, the adhesives used to secure connector 20 to planar leg 14 of bracket mount 10 and connector 42 to the windshield 40 of the vehicle would be of such character so as to provide sufficient adhesion to support the unit when in operation.

Figure 4:
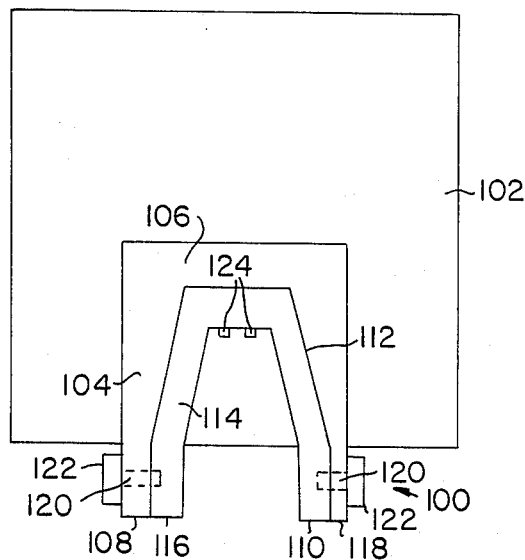
FIG. 4 is a top planar view of a radar detector exemplifying a second embodiment of the mount.
Figure 5:
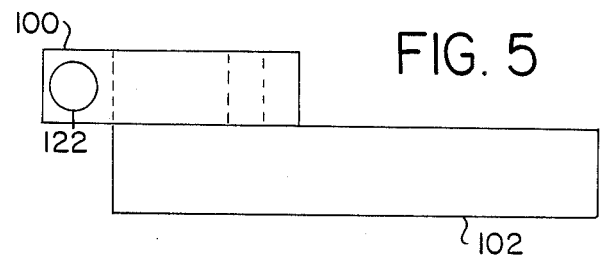
FIG. 5 is a side elevational view of a radar detector exemplifying the second embodiment of the invention.
Figure 6:
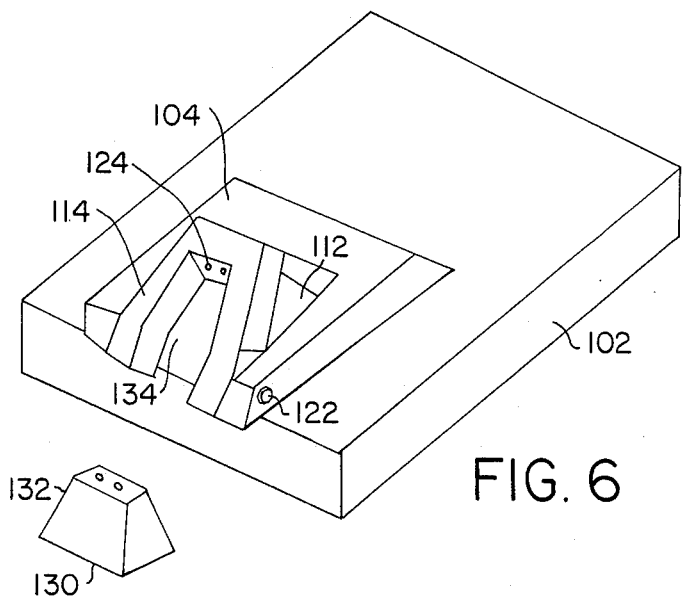
FIG. 6 is a perspective view of a radar detector exemplifying the second embodiment of the invention.

Referring to FIGS. 4, 5 and 6, there is shown a second embodiment of a bracket mount for a radar detector unit. Referring to FIG. 4 specifically, there is shown the second embodiment of bracket mount 100 secured to radar detector unit 102. In this top planar view, bracket mount 100 comprises the planar U-shaped leg 104 which is secured to radar detector unit 102 or in the alternative, can be molded as part of the outer casing of radar detector unit 102 making the outer casing and planer U-shaped leg 104 a single molded piece. Planar leg 104 is U-shaped in design having a crossleg 106 and two substantially perpendicular legs 108 and 110. Legs 106, 108 and 110 define a substantially U-shaped cavity 112.

A second planar U-shaped leg 114 which conforms in substantial configuration to U-shaped cavity 112 is rotatably secured to U-shaped planar leg 104. U-shaped planar leg 114 is rotatably secured at the extended termini 116 and 118 of legs 108 and 110 of U-shaped planar leg 104 by means of friction pins 120. Friction pins 120 are loosened or tightened by means of set knobs 122. Referring briefly to FIGS. 5 and 6, it can be seen that this configuration permits the rotation of U-shaped planar leg 114 from a substantially coplanar position with U-shaped leg 104 to an angular set position with U-shaped planar leg 104.

Positioned in the crossleg of U-shaped planar member 114 are two electrically conductive male termini 124. Electrically conductive termini 124 cooperate with a female receptacle 130 as shown in FIG. 6 to connect the radar detecting unit to a power source. Female receptacle 130, as shown in FIG. 6, is secured to the windshield of a vehicle in the same manner as the first embodiment of the invention. Female receptacle 130, as shown in FIG. 6, the second embodiment of the invention, is designed to have a tapered outer shell 132 to conform with the interior U-shaped cavity 134 of planar U-shaped leg 114. In this configuration, the connection between male termini 124 and female receptacle 130 ensures a sliding snap-fit connection to secure radar detecting unit 102 in position. The rotatability of U-shaped planar leg 114 from U-shaped planar leg 104 permits the adjustment of the radar detecting unit 102 in a vertical plane.

The second embodiment of the invention functions identically as the first embodiment. When the male termini 124 are inserted into female receptacle 130, the unit is operational. The snap-fit, sliding connection secures the unit in position and female receptacle 130 may have its wire depending down the windshield or in the alternative, up the windshield and across and down the side panel. The sliding, snap-fit connection permits the operator to connect or disconnect the unit with one hand in one easy motion. Additionally, with respect to the second embodiment, the bracket mount can be secured to an existing radar detector unit by adhesive or the like and the electrical connection 52 comprising a spaghetti cord having two male connectors 54 and 56 could connect the radar detector unit to the bracket proximate to male termini 124 or in the alternative, if the bracket were constructed with the outer casing of the radar detector unit, the connection from the radar detector unit to male termini 124 could be accomplished by internal wiring in the bracket mount itself.

The embodiments of the bracket mount as disclosed herein with respect to the mounting of a radar detector unit of an automobile windshield still has application to the mounting of a radar detector unit on a motorcycle in that the radar mount as disclosed can be affixed by means of adjustable clamps to the handlebars of a motorcycle or, more preferably, to a fairing of a motorcycle.

Additionally, while the bracket mount as disclosed herein has been discussed with respect to radar detectors, the mount has application to any electrical component accessory requiring connection to a power source and ease of installation and removability.

While the present invention has been described in the connection with the exemplary embodiments thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

I claim:

1. A bracket for supporting a radar detector or electrical component necessary on the windshield of a vehicle, said bracket comprising
   a substantially planar mounting portion;
   a substantially planar support portion secured to said mounting portion and angularly adjustable in relationship thereto having secured thereto said radar detector or electrical component accessory;
   an electrically conductive connector in electrical communication with a power source, said electrically conductive connector mounted on said windshield;
   an electrically conductive second connector having a plug secured to said substantially planar mounting portion, said electrically conductive plug in electrical communication with said radar detector or electrical component accessory, said electrically conductive plug coincident with said electrically conductive connector for removable snap-fit electrical engagement therewith.

2. A bracket in accordance with claim 1 wherein the material properties of the planar mounting portion and planer support portion permit the angular adjustable relationship between said portions to position said radar detector or electrical component accessory in a horizontal plane.

3. A bracket in accordance with claim 1 wherein said angular relationship between said planar mounting portion and planar support portion is adjustable by means of a frictionally engageable hinge positioned at the vertice of said planar mounting portion and said planar support portion.

4. A bracket in accordance with claim 1 wherein said electrically conductive second connector secured to said substantially planar mounting portion has an electrical receptacle for receipt of said electrically conductive plug comprising a spaghetti cord providing electrical communication between said radar detector or electrical component accessory and said electrically conductive plug.

5. A bracket in accordance with claim 1 wherein said electrically conductive plug comprises at least one electrode for snap-fit electrical engagement with said electrically conductive receptacle.

6. A bracket in accordance with claim 1 wherein said substantially planar support portion is secured directly to the casing of said radar detector during the molding and manufacturing process.

7. A bracket for supporting a radar detector or electrical component accessory on the windshield of a vehicle, said bracket comprising
   a substantiall planar U-shaped mounting portion;
   a substantially U-shaped planar support portion rotatably secured to said mounting portion, said planar U-shaped portion having secured thereto, said radar detector;
   an electrically conductive connector in electrical communication with a power source, said electrically conductive connector mounted on said windshield;
   an electrically conductive second connector having a plug secured to the inner surface of said substantially planar U-shaped mounting portion, said electrically conductive plug in electrical communication with said radar detector or electrical component accessory, said electrically conductive plug coincident with said electrically conductive receptacle for removable snap-fit and electrical engagement therewith.

8. A bracket in accordance with claim 7 wherein said rotatably adjustable relationship between said planar U-shaped support portion and planar U-shaped mounting portion comprises a frictionally engageable hinge positioned at the vertice of said planar mounting portion and said planar support portion.

9. A bracket in accordance with claim 7 wherein said electrically conductive plug secured to said substantially planar portion comprises at least one electrode for a snap-fit electrical engagement with said electrically conductive receptacle.

10. A bracket in accordance with claim 7 wherein said substantially planar U-shaped support portion is secured directly to the casing of said radar detector during the molding and manufacturing process, said substantially planer U-shaped mounting portion being designed to rotate to a coplanar position with said substantially U-shaped planar support portion for storage.

11. A bracket in accordance with claim 7 wherein said electrically conductive second connector secured to substantially planar U-shaped mounting portion is in internal electrical communication with said radar detector.

* * * * *